United States Patent
Cocchini et al.

(10) Patent No.: US 6,189,343 B1
(45) Date of Patent: Feb. 20, 2001

(54) APPARATUS AND METHOD FOR FORMING AN OPTICAL FIBER

(75) Inventors: Franco Cocchini, Cava Dei Tirreni; Antonio Schiaffo, Salerno, both of (IT)

(73) Assignee: Fibre Ottiche Sud F.O.S. S.p.A. (IT)

( * ) Notice: Under 35 U.S.C. 154(b), the term of this patent shall be extended for 0 days.

(21) Appl. No.: 09/064,590

(22) Filed: Apr. 22, 1998

Related U.S. Application Data

(63) Continuation-in-part of application No. 08/756,574, filed on Nov. 26, 1996, now abandoned.

(30) Foreign Application Priority Data

Nov. 13, 1996 (EP) .................................................. 96203170
Nov. 10, 1997 (EP) .................................................. 97203471

(51) Int. Cl.$^7$ .................................................. C03C 25/02
(52) U.S. Cl. .................. 65/430; 65/377; 65/402; 65/432; 65/504; 65/510; 65/529; 118/125; 118/405; 118/420; 118/DIG. 18; 118/DIG. 19
(58) Field of Search .................. 65/377, 402, 430, 65/432, 504, 510, 529; 118/125, 405, 420, DIG. 18, DIG. 19; 427/163.1, 163.2, 178, 407.2, 434.5

(56) References Cited

U.S. PATENT DOCUMENTS

| 5,366,527 | * | 11/1994 | Amos et al. | ............................ | 65/529 |
| 6,076,376 | * | 6/2000 | Onishi et al. | ........................... | 65/504 |

FOREIGN PATENT DOCUMENTS

| 2114771 | * | 8/1983 | (GB) | ...................................... | 65/432 |
| 2134842 | * | 8/1984 | (GB) | ...................................... | 65/432 |
| 58-223641 | * | 12/1983 | (JP) . | | |
| 60-11252 | * | 1/1985 | (JP) | ...................................... | 65/529 |
| 60-251154 | * | 12/1985 | (JP) . | | |
| 271748 | * | 10/1970 | (SU) | ...................................... | 118/420 |

\* cited by examiner

Primary Examiner—Stanley S. Silverman
Assistant Examiner—Michael P. Colaianni
(74) Attorney, Agent, or Firm—Norris, McLaughlin & Marcus; L. P. Brooks

(57) ABSTRACT

An apparatus for forming a optical fiber which includes a furnace for softening an optical fiber blank; a tractor for drawing the optical fiber from the softened optical fiber blank; and a first applicator for applying a coating of a first coating material to the optical fiber, the first applicator having a rotatable die.

16 Claims, 3 Drawing Sheets

APPARATUS AND METHOD FOR FORMING AN OPTICAL FIBER

This application is a continuation-in-part of application Ser. No. 08/756,574 filed Nov. 26, 1996 by the same inventors now abandoned.

BACKGROUND OF THE INVENTION

1. Field of the Invention

The present invention relates to an optical fiber, and more particularly, to a optical fiber having spin.

2. Discussion of the Related Art

In recent years, long distance fiber optic communication has become increasingly important. In long distance optical fibers, it is important to retain the integrity of signals in the optical fibers. One problem in optical fiber signal integrity is Polarization Mode Dispersion (PMD).

PMD is the broadening of a optical signal pulse in a single mode fiber due to the dependence of the group velocity of the polarization state of the field, i.e., birefringence. In the case of constant birefringence, there are two states of polarization: one called "slow" and one called "fast". For any impulse at all, the superposition of the two states cause a temporary increase in pulse width which grows linearly with distance traveled. Therefore, the optical signal pulses will disperse, and the signals become unusable if the pulses combine.

In optical fibers, birefringence is caused by asymmetries and imperfections of the optical fibers such as ellipticity of the core and by anisotropies from internal stresses. A characteristic repeat length can be generally associated to these asymmetries and imperfections, being the length after which, on average, said asymmetries and imperfections are reproduced. Typical values for said repeat length are of the order of few meters to few hundred of meters. In addition, not only do fiber parameters vary, but also external stresses and geometric deformations are introduced by spooling, cabling, or installation.

These stresses create random couplings between the polarization modes of optical fibers. Further, the continuous exchange of power between the slow and the fast states limits the expansion of the impulse to a function related to the square root of the distance. Because these stresses are random, PMD is characterized by statistics. Typically a fiber's PMD is 0.05 to 0.5 ps km$^{-\frac{1}{2}}$.

Further information, on birefringence and on PMD in optical fibers can be found, e.g., in the following articles: W. Eickhoff et al. *Applied Optics*, Vol. 20, No. 19 pp. 3428–3435 (1981) and A. F. Judy *International Wire & Cable Symposium Proceedings*, pp. 658–664 (1994).

According to the above, it is desirable to reduce PMD as much as possible. There are two ways to reduce PMD: to reduce local birefringence and to increase the power exchange between the two polarization states.

To increase the power exchange, a method has been developed to apply a twist or a spin in the optical fiber. Twist refers to the rotation of a vitrified optical fiber about its axis whereas spin refers to rotation of a molten optical fiber. Both processes are similar with respect to their effects on the two polarization states. Furthermore, the twist or spin may be applied with turns constant in direction along the length of the optical fiber or with turns alternating in direction along the length of the optical fiber.

The amount of rotation applied to a twisted or spun fiber is characterized by the twist, $\tau$, which is defined by the number of turns per unit length. If twist is high, in relation to the previously mentioned repeat length, each of the two polarizations will be alternately in the slow and the fast states along fiber lengths shorter than the typical perturbation lengths. This results in a continuous and homogenous exchange of power between the two states, thereby significantly reducing the PMD.

Typically, spun fibers require $\tau=1–10$ turns/m to induce a birefringence of $\beta=1–10$ m$^{-1}$ in order to overcome the effects of ellipticity and stress. When alternated twist is applied, the inversion period of the twist, i.e. the distance required to alternate the direction of the twist back and forth, is less critical and is typically 1–100 m.

The Applicant has afforded the problem of applying twist to the fiber in the molten phase, in order that such twist be frozen in the glass structure, when it is solidified in a cooling stage.

WO 83/00232, (Central Electricity Generating Board) discloses a method of making an optical fiber comprising drawing the fiber from a heated preform whilst effecting continuous relative rotation between the preform and the drawn fiber. To produce the spun fiber, the preform may be rotated during the drawing process.

The Applicant has observed that the method of rotating the preform requires the rotation of a large, potentially imbalanced, mass at high rotational velocity. For example, an optical fiber having an alternating twist of $\tau=1$ turn/m and a draw speed of $v_{draw}=10$ m/s requires the preform to rotate at 600 revolutions per minute. This can cause serious problems of vibrations in the fiber. As a result, the method is usually unsuitable.

U.S. Pat. No. 5,298,047, to Hart, Jr. et al., discloses that PMD can be substantially reduced if, during drawing of the fiber, a torque is applied to the fiber such that a "spin" is impressed on the fiber. Desirably the torque is applied such that the spin impressed on the fiber does not have a constant spatial frequency, e.g., has alternately clockwise and counterclockwise helicity. According to Hart, Jr. et al., the torque advantageously is applied at a point downstream from the curing station, and it is most preferred to apply the torque by means of the first guide roller. The guide roller can be caused to oscillate back and forth or to move back and forth axially.

The above prior art methods require the rotation of a preform or the application of a torque, by means of a guide roller, while drawing the optical fiber.

The Applicant has observed that oscillation or movement of a guide roller requires a complex mechanical apparatus and can cause a relevant stress on the fiber coating just after its application and curing. Furthermore, conventional coating applications resist the transmission of torque from the roller to the uncooled optical fiber in the vicinity of the neckdown area of the furnace, thereby reducing effectiveness of the method.

Coating of glass optical fibers is desirable for the chemical and physical protection of the fibers. A common practice is to apply to the glass fiber a double-layer acrylic coating, whereby a first layer, with a relatively low elastic modulus, constitutes a "soft cushion" around the fiber and a further layer, with a relatively high elastic modulus, protects the fiber from the environment.

To give the fiber a homogeneous protection, it is important that each coating layer is concentric with the glass fiber. Concentricity of a layer, defined as the ratio between the minimum and maximum thickness of said layer in a section, is conveniently higher than 0.7, preferably higher than 0.85. Lower concentricity values correspond to a coating layer which is too thin on one side and, consequently, gives the fiber an insufficient protection. Increasing the coating layer thickness, while allowing low concentricity, might solve the protection problem, but would entail an increased bulkiness for the coated fiber and an increased cost.

To improve concentricity of the coating, the Applicant has tried use of a self-centering die, with a radial profile such as to cause high radial pressure, together with homogeneous feeding of the coating resin into the die, so as to get a homogeneous pressure. Both these measures have shown to be insufficient, as they can be made ineffective either by a slight lack of symmetry in the die or in the die holder, or by a slight lack of alignment of the drawing apparatus, both of which are difficult to avoid.

SUMMARY OF THE INVENTION

Accordingly, the present invention is directed to an apparatus and method for fabricating an optical fiber that substantially obviates one or more of the problems due to limitations and disadvantages of the related art.

An object of the present invention is to provide an apparatus with reduced complexity for fabricating an optical fiber having spin.

Another object of the present invention is to provide an apparatus and a method for fabricating an optical fiber, wherein resistance to an applied torque is reduced.

A further object of the present invention is to provide an apparatus and a method for drawing an optical fiber and coating it with one, or more, highly concentric coating layers.

The Applicant has found that a torque can be applied to a fiber by rotation of a die in a coating applicator.

A spin can thus be imparted on the optical fiber in the softened region near the neckdown area.

Further, the Applicant has found that a highly concentric coating can be applied to the fiber, by rotating a die in a coating applicator.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for forming a optical fiber includes a furnace for softening an optical fiber blank; means for drawing the optical fiber from the softened optical fiber blank; and a first applicator for applying a coating of a first coating material to the optical fiber, the first applicator having a rotatable die.

To advantage, the apparatus comprises rotating means associated with said rotatable die, such as an electromagnetic, mechanical or hydraulic motor, or a gas turbine.

The rotating means can be adapted to rotate the rotatable die in a constant direction, or in alternating opposite directions.

Advantageously the rotatable die has a concave portion having a passage for the optical fiber. It further advantageously comprises means for feeding the first coating material to the concave portion of the rotatable die.

In an embodiment, the rotatable die is of a pressurized type. In this embodiment, the die has preferably a support and a pressurized concave member surrounding the optical fiber and rotatably engaged to said support. Rotatable sealing means are preferably provided between said support and said pressurized concave member.

The first coating material is advantageously a viscous fluid.

Preferably the rotatable die turns about an axis along which the optical fiber is drawn.

In an embodiment, the apparatus comprises a second applicator for applying a coating of a second coating material to the optical fiber. The second applicator may include a second rotatable die, which may be of a pressurized type.

In a preferred embodiment, the apparatus comprises a cooling stage for cooling the optical fiber.

According to another aspect, the present invention relates to a method for forming an optical fiber which includes the steps of softening an optical fiber blank; drawing an optical fiber from the softened optical fiber blank; applying a coating of a coating material on the optical fiber through a die; wherein said step of applying a coating further comprises rotating said die while said coating material flows around the optical fiber.

Preferably rotation of said die causes said coating material to turn and the turning of said coating material applies a torque to the optical fiber.

In an embodiment, said die is rotated in a constant direction, and/or rotation of said die turns the optical fiber in a constant direction.

In an alternative embodiment, said die is rotated in alternating directions, and/or rotation of said die turns the optical fiber in alternating directions.

Preferably said method further comprises the step of cooling the drawn optical fiber. Said step of cooling the drawn optical fiber advantageously sets twist in the optical fiber.

In said method, the step of applying a coating may include applying a first layer of a first coating material through a first die and a second layer of a second coating material, over said first layer, through a second die, wherein at least one of said dies is rotated. According to a preferred embodiment, said first die is rotated. According to another embodiment, both said dies are rotated. In the latter case, said second die is preferably rotated in a same direction as said first die.

Preferably said die is rotated with a maximum rotation equal to, or greater than, 5,000 rev/min. More preferably, said maximum rotation is comprised between 10,000 and 30,000 rev/min, in association with a fiber drawing velocity comprised between 1 and 10 m/s.

To the purpose of the present invention, maximum rotation indicates either rotation speed, in case of constant and uniform rotation, or the peak value of the rotation speed in case of alternate or non-uniform rotation.

According to a further aspect, the following invention has to do with a method for reducing polarization mode dispersion in an optical fiber, comprising the steps of providing a partially softened portion of the optical fiber and rotating a viscous fluid about a longitudinal axis of the fiber, and in contact therewith, whereby a torque is applied by viscous drag to said partially softened portion of the optical fiber.

Said viscous fluid can to advantage be a fiber coating material. Said torque can be applied by rotating a die through which said coating material is applied to the optical fiber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention applies spin to the optical fiber in the process of applying a coating to the optical fiber. A number of coating devices are known in the art including Published Japanese Patent Application 52-117935 to Ueno et al., U.S. Pat. No. 4,194,462 to Knowles, and U.S. Pat. No. 4,246,299 to Ohls. Ueno et al. discloses a thin film coating apparatus for coating primer on a glass fiber wherein dust is prevented from attaching on the coating. Knowles teaches a coating assembly including a recessed housing and a trust block wherein aligned passages extend through each of the elements so that an optical waveguide can be inserted into the apparatus from the side rather than threaded endwise through the apparatus. Ohls discloses a method of coating an optical waveguide filament employing a die body having at least partly tapered central aperture and radial means for introducing coating material to the central aperture. However, the systems of the above references are not suitable for applying spin to an optical fiber.

Figure 1:
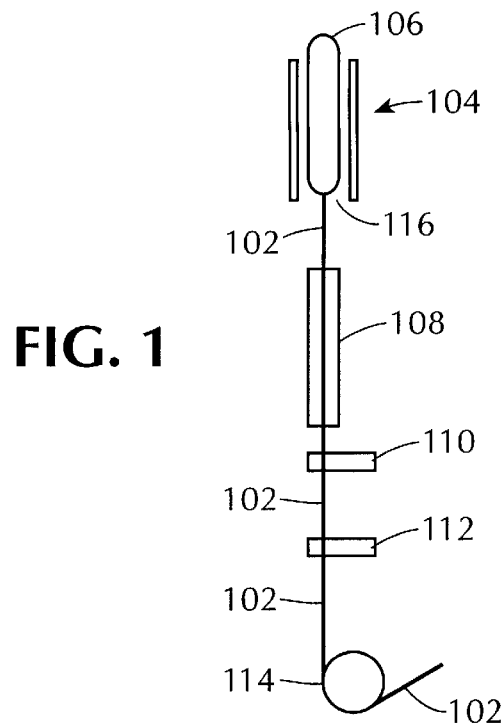
FIG. 1 is a diagram of an apparatus for fabricating an optical fiber.

FIG. 1 shows an apparatus in accordance with the present invention for fabricating an optical fiber 102. The apparatus comprises a furnace 104 for softening an optical fiber blank 106, a cooling stage 108, a first applicator 110 for applying a first coating on the optical fiber 102, a second applicator 112 for applying a second coating on the optical fiber 102, and a tractor 114 for drawing the optical fiber 102 from the softened optical fiber blank 106.

The furnace 104 has a neckdown area 116 from which the optical fiber 102 is drawn. The blank 106 is fed into the furnace using a movable means (not shown) so that the furnace at least partially surrounds the blank 106. The blank 106 may be of any desired shape, but the blank 106 is commonly an elongate cylinder or tube. Because the index of refraction of the optical fiber 102 generally varies radially, the index of refraction of the blank 106 in general also varies radially. Often, this is achieved by forming the blank 106 as a rod-shaped core inside a shell, the core having a greater index of refraction. The front end of the blank 106 is softened so that it can be drawn into an optical fiber. The optical fiber 102 is drawn through the neckdown area 116, and then through the cooling stage 108 to be cooled. By cooling the optical fiber 102, any spin is frozen into the optical fiber 102. In drawing the optical fiber 102, various parameters such as temperature, draw speed and blank size are controlled to precisely regulate the size of the optical fiber 102.

The first and second applicators 110 and 112 include a die having openings through which the optical fiber 102 passes. In the first and second applicators 110 and 112, the optical fiber 102 passes through and is coated by a fluid coating material. The first and second applicators may also have UV lamps to cure the optical coating after application. With respect to the cured coatings, the first coating is preferably softer than the second coating. As an alternative to a first applicator and a second applicator for applying a double layer of coating, a single applicator may be provided when application of a single layer of coating to the optical fiber is appropriate. A number of materials are suitable for the first and second coating materials, but generally resins are preferred, in particular acrylic resins.

The tractor 114 provides the force in drawing the optical fiber 102 from the softened blank 106. Further, in the preferred embodiment, the tractor 114 determines the draw speed of the optical fiber 102. Finally, the completed optical fiber is stored on a take-up reel until it is used. The take-up reel may be integral with the tractor 114 or it may be separate.

Figure 2:
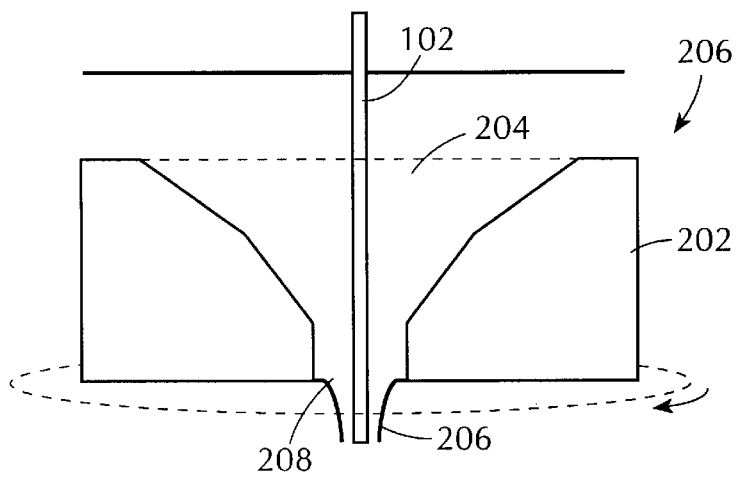
FIG. 2 is a diagram of a rotatable die for applying a coating in accordance with the present invention.

In a preferred embodiment, the first applicator 110 includes a rotatable die 200 which is adapted to rotate about an axis through which the optical fiber 102 passes. FIG. 2 shows a rotatable die 200 according to a preferred embodiment of the present invention.

As shown in FIG. 2, the rotatable die 200 includes a funnel-shaped structure 202, and a reservoir 204. In a preferred embodiment, the reservoir is not eccentric. As the optical fiber 102 passes through the reservoir, the optical fiber is coated with a coating material contained therein. In this manner, the first coating 206 is formed on the optical fiber 102. The thickness of the first coating 206 is regulated by the size of the exit aperture 208, the viscosity of the resin, and the draw speed of the optical fiber 102.

To provide a spinning of the optical fiber 102, the die 200 is a rotatable die as indicated the by arrow and dotted line of FIG. 2, and can be set into rotation by appropriate rotation means, e.g., mechanical, electric, magnetic, including, e.g., gears, belts, turbines, electromagnetic couplers, or by other known means. Rotatable sealing means may be conveniently located between the rotating die and the die support. As the rotatable die 200 turns, the resin also turns as a result of the resin's viscosity. As the resin turns about the optical fiber 102, the resin imparts a torque on the optical fiber 102.

Generally, the coupling between the turning of the rotatable die 200 and the torque applied on the optical fiber 102 increases with viscosity of the resin. While a number of coating materials can be used for the first coating 206, resins such as Neorad NEP 58 and NEP 94, by Zeneca, London (GB) have been found to be suitable. NEP 58 has a viscosity of 5.2 Pa·s at 25° C. (1.9 Pa·s at 40° C.), and forms a coating having a tensile modulus of 3.30 MPa. NEP 94 has a viscosity of 5.0 Pa·s at 25° C. (2.2 Pa·s at 40° C.), and forms a coating having a tensile modulus of 3.4 MPa.

As known, the majority of fluids used to coat optic fibers do not behave as newtonian fluids and their viscosity may present complex phenomena such as thixotropy, viscoplasticity or pseudoplasticity. Thus, in many cases viscosity per se is inadequate to distinguish satisfactorily the coating materials which will be able to apply a torque to an optical fiber according to the present invention. In general, the coating materials will be selected among those fluids which are able to apply a torque to an optical fiber which decreases PMD thereof to 0.1 ps/Km$^{1/2}$ or less when said coating material is applied to said optical fiber by means of a rotatable die rotating at at least 5,000 rev./min. according to this invention. Preferably, the viscosity the coating material is of at least 1 Pa·s at the temperature of the coating fluid entering into the rotatable die. Still preferably, said viscosity value is from 2.1 to 20 Pa·s. Even more preferaby said viscosity value is from 2.1 to 10 Pa·s.

A spun optical fiber having an alternating twist of τ=1 turn/m and a draw speed of $v_{draw}$=10 m/s requires, e.g., maximum rotation at 600 rev/min. The present invention can provide such rotations by rotating the rotatable die 200, e.g., with maximum rotations of 5,000 rev/min, or more. As discussed, the rotatable die 200 is either turned in a constant direction or turned in alternating directions.

Further, because the coating material applies the torque to the optical fiber 102, the problem of the coating material resisting the torque applied by prior art rollers is overcome. Instead, the torque is more freely transmitted through the optical fiber to the softened portion near the neckdown area 116 of FIG. 1. After the softened optical fiber 102 is spun near the neckdown area 116, the spin becomes set into the optical fiber in the cooling stage 108.

Therefore, in accordance with the present invention, the optical fiber is fabricated as follows. An optical fiber blank is softened in a furnace. Then, the softened blank is drawn through a neckdown area of the furnace to form an optical fiber by a force provided by a tractor. Next, the optical fiber is cooled in a cooling stage. In this step, any spin applied to the softened optical fiber is frozen into the optical fiber. Then, the drawn optical fiber passes through and is coated by first and second applicators with first and second coatings, respectively. Preferably, the first applicator applies a soft coating, and the second applicator applies a hard coating. The first and second coatings may be resins, for example. In accordance with the present invention, a rotatable die of the first applicator is turned. As a result, the rotation of the rotatable die causes the coating fluid contained therein to also turn. The turning of the coating fluid about the optical fiber causes a torque on the optical fiber, thereby imparting a spin on the optical fiber in the softened region near the neckdown area. In the described process, the turning direction of the rotatable die may be constant or alternating.

Only rotation of the first die has been discussed so far. However, in the cases where a second applicator is present, the second applicator may comprise a rotatable die to impart a spin to the fiber by causing a torque to the fiber via the viscous resin of the second coating and the cured first coating. The turning direction of a rotatable die of the second applicator may be constant or alternating. Making both first and second die rotatable may involve a more complex mechanical structure, but the provision of two rotatable dies allows the application of greater torque to the fiber. In this case, the rotation speed of the two rotatable dies are adapted to the different viscosities of the two liquid coating resins.

Figure 3:
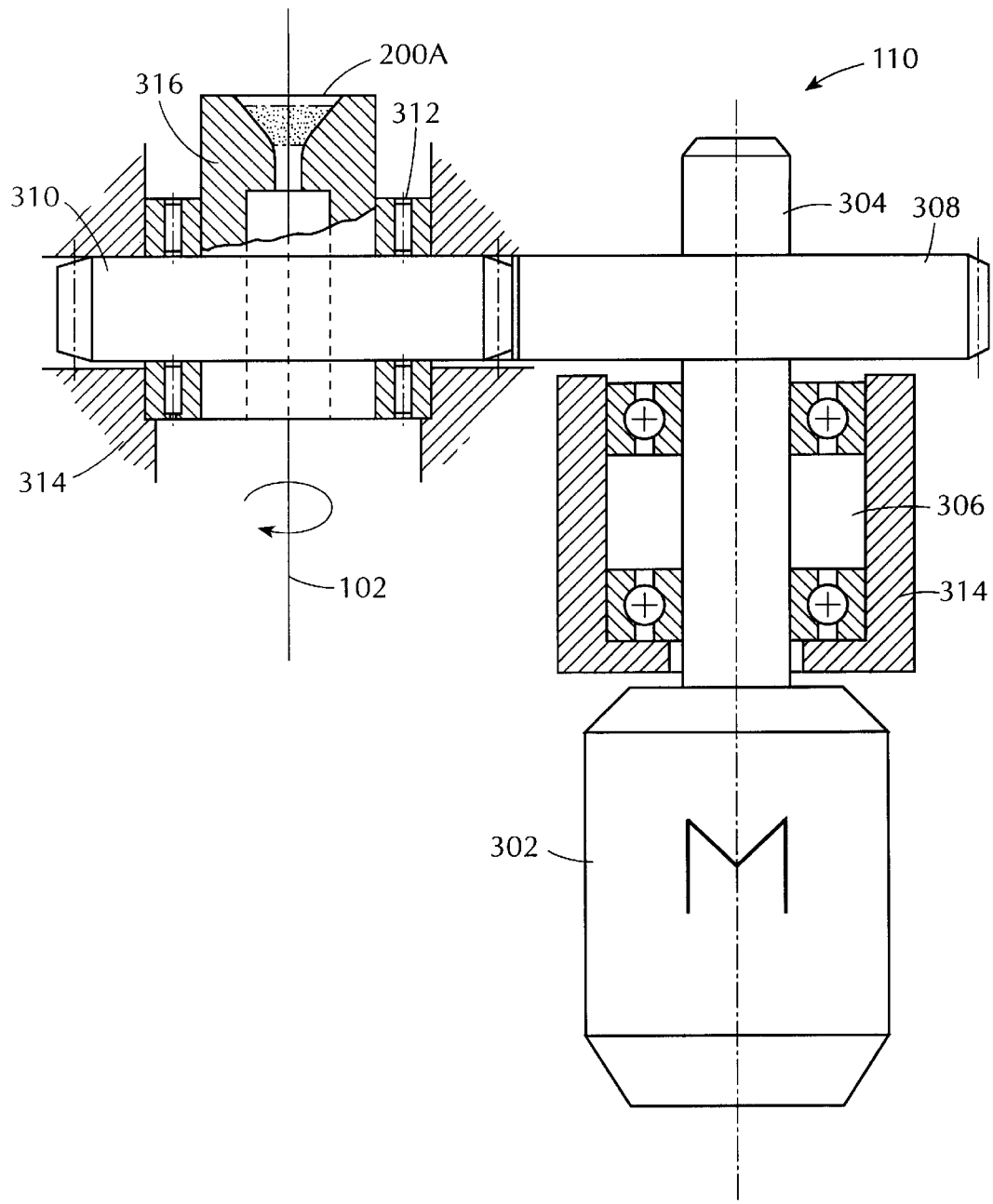
FIG. 3 is a diagram of an applicator having a rotatable die in accordance with the present invention.

FIG. 3 shows an embodiment of a first applicator 110 having a rotatable die 200A. As shown in FIG. 3, the first applicator 110 comprises a motor 302, a shaft 304, a first bearing mechanism 306, a first gear 308, a second gear 310, a second bearing mechanism 312, and a rotatable die 200A. The motor 302 rotates in a constant direction if an optical fiber having twist of a constant direction is desired or in alternating directions if an optical fiber having twist of alternating directions is desired. Shaft 304 is driven by motor 302. The shaft 304 is supported and aligned by support 314 and first bearing mechanism 306. The first bearing mechanism 306 allows the shaft 304 to freely rotate. First gear 308 is fixedly mounted on shaft 304. First gear 308 drives second gear 310 which is held in position by the second bearing mechanism 312 and support 314. The second bearing mechanism 312 allows the second gear 310 to freely rotate. Furthermore, the bearing mechanism 306 and 312 of a preferred embodiment would minimize vibration and friction. The second gear may include a second gear shaft 316. The second gear shaft 316 is hollow so that the optical fiber 102 can be drawn through the apparatus. The rotatable die 200A is mounted on the second gear 310.

The operation of the first applicator 110 will now be discussed. The motor 302 drives the second gear 310 via shaft 304 and first gear 308. The rotatable die 200A is mounted on the second gear 310. Therefore, as the second gear 310 is rotated, the rotatable die 200A, containing a viscous liquid coating material, also rotates. As a result, the liquid coating material turns according to the rotation of the rotatable die 200A. Meanwhile, the optical fiber 102 is drawn through the first applicator 110. Specifically, the optical fiber 102 passes through the rotatable die 200A and the second gear 310. Accordingly, the first liquid coating material flows around the optical fiber 102. As a result, a torque is applied to the optical fiber 102. Further, the optical fiber 102 is coated with the first coating material after passing through the first applicator 110

Figure 4:
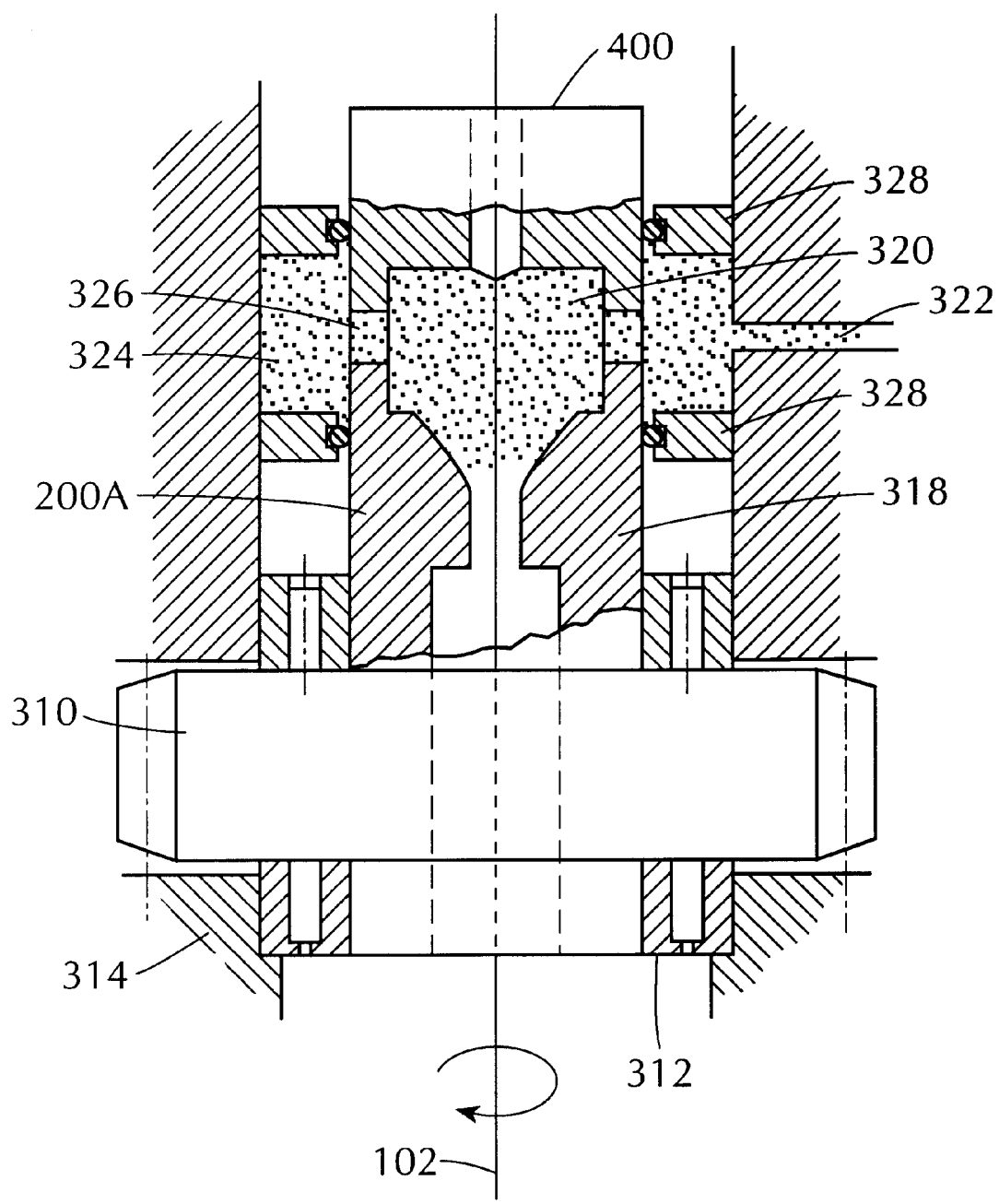
FIG. 4 is a diagram of a pressurized rotatable die in accordance with the present invention.

A rotatable die of the non-pressurized type has been so far described. In its place, a pressurized rotatable die can be conveniently used, as schematically shown in FIG. 4. Parts of FIG. 4 corresponding to parts of FIG. 3 have been denoted by the same numeral. A rotatable die 400 is mounted on gear 310 through gearing mechanism 312, anchored to support 314. The rotatable die includes a hollow gear shaft 318, having passages for an optical fiber 102 at its upper and lower portions and having a hollow chamber 320 in communication with a die 200A. A supply duct for a coating liquid is provided through support 314, to feed a chamber 324, extended around a middle portion of gear shaft 318. Chamber 324 is in communication with chamber 320 through gear shaft 318, via passages 326. Leakage from chamber 324 is prevented by convenient rotatable sealing means 328, providing a low friction sealing between support 314 and gear shaft 318, so as to allow free rotation of gear shaft 318.

In operation, a liquid coating material is fed under pressure from duct 322 to chamber 320, through chamber 324 and passages 326. Leakage from the upper passage for the optical fiber through gear shaft 318 is prevented from happening by choosing a chamber pressure that can be balanced by the suction caused by fiber 102 while it is dragged through the same passage.

As would be evident to one skilled in the art, the rotation of the rotatable die can be achieved by other mechanisms. For example, gears 308 and 310 can be replaced with a belt system or the rotatable die may be mounted directly to a motor shaft. In addition, the motor 302 may be of any type, e.g., electro-magnetic, or mechanical, or hydraulic, or a gas turbine. Accordingly, any apparatus for turning the rotatable die 200A can be used. Moreover, in applications where a second rotatable die is used, the apparatus similar to that of FIG. 3 could be used to rotate the second rotatable die. Furthermore, the second rotatable die may include a pressurized die.

Figure 5:
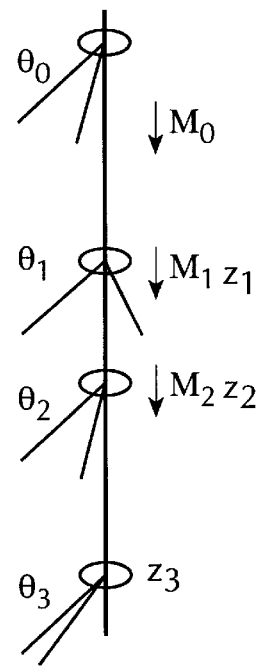
FIG. 5 is a diagram of an optical fiber showing the rotation and torque at various stages.

The principles of spinning the optical fiber the rotation of a rotatable die containing a viscous coating material will now be explained. FIG. 5 shows the process of spinning an optical fiber in accordance with the present invention.

In FIG. 5, axial position is designated by z, and rotation of the optical fiber, solidified below the neckdown area of the furnace, is designated by $\theta=\theta(z)$. The origin of the z axis is taken at a point where the fiber has reached a stable diameter (typically 125 $\mu$m), such that $\theta(0)=\theta_0$. The primary applicator is located at $z_1$ and $\theta(z_1)=\theta_1$. In the same way, the secondary applicator will be located at $z_2$ and $\theta(z_2)=\theta_2$. Finally, the tractor is located at $z_3$ and $\theta(z_3)=\theta_3$.

As has been described, torque can be applied to the fiber through rotation of the rotatable die that applies the first coating, as previously shown with reference to FIG. 2. For Newtonian fluids which are, to a close approximation, acrylic resins with a low molecular weight, the flow can be described as the linear superposition of two flows: a draw flow, which is associated with the fiber's axial velocity and involves the draw of the resin, and a flow resulting from the relative rotation between the fiber and the rotatable die.

The rotatable die can be modeled as a cylinder of effective radius $R_1$ and height $h_1$, which rotates with an angular velocity $\Omega_f$ imposed from outside. Therefore, the flow from the rotation is essentially a Couette flow between two cylinders, the external one comprising the rotatable die and the internal one comprising the fiber of radius $r_0$ which, as a result of the viscous forces of the resin and the elastic torsion of the fiber, rotates at angular velocity $d\theta_1/dt$. The torque $M_1$ (position $z_1$) is given by $$M_1 = 4\pi\mu_1 h_1\left(\Omega_f - \frac{d\theta_1}{dt}\right)\frac{r_0^2}{1-\left(\frac{r_0}{R_1}\right)^2} = k_1\left(\Omega_f - \frac{d\theta_1}{dt}\right) \quad 1$$

where $\mu_1$ is the viscosity of the resin at the application temperature. In the second applicator, which is here considered as being non-rotated, a torque will be developed which is connected to the local rotation $d\theta_2/dt$ of the fiber alone. With notation analogous to the above, the torque $M_2$ (position $z_2$) is given by $$M_2 = 4\pi\mu_2 h_2 \frac{d\theta_2}{dt}\frac{r_1^2}{1-\left(\frac{r_1}{R_2}\right)^2} = k_2 \frac{d\theta_2}{dt} \quad 2$$

where $r_1$ is the radius of the first coating.

The torque due to the viscous rotation in the neckdown area is a function of the rotational velocity $$M_0 = K_0 \frac{d\theta_0}{dt}. \quad 3$$

The constant $K_0$ can be evaluated by considering that through the neckdown area the torque must be constant in the presence of a rotation of angular velocity $\omega(z)$. Therefore, in any section with constant z, the torque, in cylindrical coordinates, at the neckdown area is $$M_0 = 2\pi \int_0^{R(z)} \tau_{z\theta} r^2 \, dr \quad 4$$

where $\tau_z\theta$ is a component of the stress tensor and R(z) is the radius of the molten preform at z. Assuming homogeneous rotation at every section, one has $$v_\theta = \omega(z)r \quad 5$$

and $$\tau_{z\theta} = -\mu(z)\frac{\partial v_\theta}{\partial z} \quad 6$$

where $\mu(z)$ is the local viscosity of glass, depending on temperature. Integrating with respect to r, a differential equation for the angular velocity is derived:

$$M_0 = \frac{\pi}{4} R(z)^2 \mu(z) \frac{d\omega}{dz} \quad 7$$

with boundary conditions: $\omega(\text{preform})=0$; $\omega(\text{fiber})=d\theta_0/dt$. Therefore, after integration, $$M_0 = \frac{\pi}{4} \frac{1}{\int_0^{L_{nd}} \frac{dz}{R(z)^2 \mu(z)}} \frac{d\theta_0}{dt} \quad 8$$

where $L_{nd}$ is the length of the region in which the neckdown takes place (i.e., the passage from the preform radius to the fiber radius). Comparison of equations 3 and 8 gives the value of $K_0$.

To obtain the profiles of radius and viscosity, R(z) and $\mu(z)$, respectively, it is necessary to take into account the transport equations that describe the drawing process (see, e.g., R. B. Bird, W. E. Stewart, E. N. Lightfoot: "Transport Phenomena", John Wiley) If, for example, $V_{draw}$ is 10 m/s, draw tension is 100 g, R(preform) is 3 cm (typical process parameters), it results $K_0=2\times10^{-4}$ dyne·cm/(rev/min).

Since fiber portions are now being considered in which the optical fiber is solid and can be modeled as being essentially elastic, the relationship between torque M(z) and twist $d\theta/dz$ is given (see, e.g., L. Landau, E. Lifchitz "Theorie de l'élasticité")

$$M(z) = \frac{d\theta}{dz}\frac{\pi}{4}\frac{E}{1+\nu}r_0^4 = H\frac{d\theta}{dz} \quad 9$$

where E is Young's modulus for the optical fiber (72,000 MPa for glass), $\upsilon$ is Poisson's ratio (0.4 for glass), and $r_0$ is the radius of the fiber (e.g., 0.0625 mm). With these parameter values, H≈6.16 dyne·cm/(rad/m).

Ignoring fiber inertia in rotation, the sum of the torques must be zero at every point. With respect to FIG. 5, $$-k_2 \frac{d\theta_2}{dt} + H\left(\frac{\theta_1-\theta_2}{z_2-z_1} - \frac{\theta_2-\theta_3}{z_3-z_2}\right) = 0 \quad 10$$

$$k_1\left(\Omega_f - \frac{d\theta_1}{dt}\right) + H\left(-\frac{\theta_1-\theta_2}{z_2-z_1} + \frac{\theta_0-\theta_1}{z_1}\right) = 0$$

$$-K_0 \frac{d\theta_0}{dt} - H\frac{\theta_0-\theta_1}{z_1} = 0.$$

An implicit assumption is that H is the same along the length of the optical fiber (from 0 to $z_1$) and for the optical fiber with one (partly crosslinked) coating ($z_1$ to $z_2$) or with two coatings (the outer being partly crosslinked) ($z_2$ to $Z_3$). This assumption is generally acceptable as the Young's modulus for the coating is very low in comparison to that of glass.

In the preferred embodiment it will be sought to have $M_2 \ll M_1$ in order to avoid excessive torque in the elastic portion of the optical fiber. The previous condition can be met, in a preferred embodiment, by choosing the viscosity $\mu_1$ of the first liquid coating substantially higher than the viscosity $\mu_2$ of the second liquid coating as, e.g., in the case of the experiments described in the following, where $\mu_2$ is more than double than $\mu_2$. If $\mu_1$ is substantially higher than $\mu_1$, provision of a rotatable die in the second coating applicator is expected to give only a small efficiency improvement in coupling torque to the fiber. If, on the contrary, $\mu_2$ is about equal to, or less than, $\mu_1$, a rotatable die provided in the second applicator might be particularly effective in imparting torque to the fiber. In the above, the skilled in the art can consider using a rotatable die in a second applicator, if the operating conditions for a single rotatable die, such as coating viscosity, die rotating speed, and torque to be applied, are found to be critical in relation to the sought fiber drawing velocities or other process parameters. Further, the skilled in the art can select the coating material (or materials) in order that its (their) viscosity is better adapted to the operating conditions, in accordance with the teaching of the present invention. In the following example it will be assumed that the condition $M_2 \ll M_1$ applies. In that case, $$\frac{\theta_1 - \theta_2}{z_2 - z_1} = \frac{\theta_2 - \theta_3}{z_3 - z_2} = \frac{\theta_1 - \theta_3}{z_3 - z_1}. \qquad 11$$

Further, $K_0$ is small, so that $\theta_0 = \theta_1$. The angle $\theta_3$ represents the residual rotation in the tractor, in spite of the torque provided by friction. The rotatable die is conveniently capable of transferring the highest torque when $\theta_3 = 0$. In the following calculations, this condition is assumed to be held. A non-zero $\theta_3$ would give as a disadvantage a partial residual torque of the reeled fiber, torque which in any case would not be permanent and could be relaxed in successive phases of rewinding. Therefore, in this case $$\Omega_f = \frac{d\theta_0}{dt} + \theta_0 \frac{H}{k_1(z_3 - z_1)} \qquad 12$$

As an example, to obtain a given level $\tau$ of maximum twist and a given number n of maximum fiber turns, at a draw velocity $v_{draw}$, an alternated rotation $$\theta_0 = 2\pi n \sin(\Gamma_n t) \text{ for } n=1, 2, 3, \ldots \qquad 13$$

can be applied to the fiber by appropriate alternated rotation of the rotatable die, where $\Gamma_n$ is $$\Gamma_n = \frac{\tau \cdot v_{draw}}{2\pi n}. \qquad 14$$

A complete period of rotation inversion is equal to $$T_n = \frac{2\pi}{\Gamma_n} = \frac{4\pi^2 n}{\tau \cdot v_{draw}}. \qquad 15$$

Therefore, by integrating the angular velocity, one has that the rotation of the rotatable die should be $$\theta_f = 2\pi n \left( \sin(\Gamma_n t) - \cos(\Gamma_n t) \frac{H}{\Gamma_n k_1 (z_3 - z_1)} \right). \qquad 16$$

As an example, a process is performed with a draw speed of $v_{draw}=10$ m/s to obtain a maximum twist $\tau=1.5$ turn/m and one complete turn of the fiber (n=1); the inversion frequency is $\Gamma = 5\pi$ rad/s and the period is 0.4 s; the first coating fluid has a viscosity $\mu_1=5$ Pa s; the geometry of the rotatable die is such that $h_1=4$ mm and $R_1=120$ mm; the die has constant $k_1=0.0135$ dyne·cm/ (rad/s); and the distance from the rotatable die to the tractor is $z_3-z_1=5$ m. Then, the rotation of the rotatable die (in rad/s) is given by: $\theta_f(t)=2\pi[\sin(5 \pi t)-5.82 \cos(5 \pi t)]$. Further, the maximum angular velocity is $\Omega_{f, max} \approx 570$ rad/s $\approx 5400$ rev/min. The maximum torque at the rotatable die is $M_{1, max} \approx 7.7$ dyne·cm.

Another important consideration is the elastic torque of the fiber, $$\frac{\theta_1 - \theta_3}{z_3 - z_1}, \qquad 17$$

between the coating applicator, where active torque is applied, and the tractor. This torque should not be excessive in order to avoid breaks in the optical fiber and because it would require high angular velocities in the rotatable die. Preferably the residual elastic torque of the fiber, if any, is less than 5 turn/m, more preferably less than 2 turn/m.

Experiment 1

In a first experiment performed by the Applicant, an apparatus for drawing an optical fiber as previously described was used. In particular, the die was a pressurized rotatable die as previously described with reference to FIG. 4. The following parameter values were selected:

$V_{draw}=7.25$ m/s $\mu_1=5-10$ Pa·s $r_1=95$ μm $\mu_2=2-5$ Pa·s $r_2=125$ μm.

It is to be noted that the resin temperature in the die locally increases, due to viscous friction caused by die rotation and by axial movement of the fiber. The given ranges of values for the resin viscosities correspond to the temperatures of the resin in the die.

The experiment was repeated with non-rotating die and with die having non-zero rotation $\Omega_f$, either constant or alternated with alternating frequency $\Gamma$.

Results are summarized in the following table, where PMD was measured for fiber lengths of 1 km, drawn from one single preform, in the given order, under different die rotation conditions, as indicated.

| $\Omega_f$ (rev/min) | $\Gamma$ (Hz) | PMD (ps/km$^{1/2}$) | Primary coating concentricity | Secondary coating concentricity |
|---|---|---|---|---|
| 0 | 0 | 0.211 | 0.5 | 0.83 |
| 22,000 | 1,5 | 0.092 | 0.88 | 0.85 |
| 0 | 0 | 0.201 | 0.69 | 0.81 |
| 22,000 | 2 | 0.054 | 0.86 | 0.85 |
| 12,000 | 0 | 0.132 | 0.63 | 0.82 |

As it can be seen from the table, rotation of a die gave fibers with lower PMD, or higher coating concentricity, or both, in comparison with fibers coated by a non-rotating die. It is further observed that alternated die rotation resulted in relatively lower PMD values.

The high speed rotation of the liquid coating outside the applicator, before curing, could in principle cause problems in the coating application, e.g. lack of adhesion between the coating and the glass fiber. However, the Applicant has found that no such problem arises. Direct microscopic observation of samples of coated fiber produced in the experiment has shown a good coating adhesion to the glass fiber and, in general, a coating quality similar to that resulting from application by a standard, non-rotating die. This has been confirmed by microscopic observation of the coated fiber after immersion of the fiber into water at 60° C. for a period of 30 days. It is believed that the acting centrifugal forces are offset by the atmospheric pressure and by the surface tension of the liquid coating.

Experiment 2

In a second experiment performed by the Applicant, with the same apparatus used during the first experiment, but with a different preform, the following parameter values were selected:

$v_{draw}$=4 m/s
$\mu_1$=5–10 Pa·s
$r_1$=95 $\mu$m
$\mu_2$=2–5 Pa·s
$r_2$=125 $\mu$m The experiment was repeated while giving the die an alternated rotation, with two values of maximum rotation $\Omega_f$ and with alternating frequency $\Gamma$=2 Hz.

Results are summarized in the following table:

| $\Omega_f$ (rev/min) | $\Gamma$ (Hz) | PMD (ps/km½) | Primary coating concentricity | Secondary coating concentricity |
|---|---|---|---|---|
| 11,000 | 2 | 0.064 | 0.85 | 0.85 |
| 22,000 | 2 | 0.073 | 0.97 | 0.82 |

Low PMD values and a high coating concentricity are obtained in both cases.

Experiment 3

In a third experiment performed by the Applicant, with the same apparatus and the same parameter values as indicated for the first experiment, fibers were drawn from eight different preforms, in each case both with non-rotating die and with alternately rotating die. In the latter case, maximum rotation was $\Omega_f$=10000 rev/min and alternating frequency was $\Gamma$=4 Hz. Samples of 1 km length were cut from the fibers drawn from the preforms while the die was non-rotating. The PMD of each sample was measured: the average PMD was 0.205 ps/km$^{1/2}$, with a standard deviation of 0.068 ps/km$^{1/2}$. A total of 25 samples, each of a length of 1 km, were cut from the fibers drawn from the preforms while the die was rotating, and the corresponding PMD measured. In this case the average PMD was 0.077 ps/km$^{1/2}$, with a standard deviation of 0.014 ps/km$^{1/2}$. The maximum PMD for said 25 samples was lower than 0.10 ps/km$^{1/2}$.

Therefore, a high quality optical fiber having spin is obtained in accordance with the present invention. By rotating a rotatable die during the application of an optical fiber coating, the troublesome procedure of creating spin by rotating a preform or by oscillating or moving a guide roller is avoided. Further, a torque is applied with reduced resistance. That is, torque is more efficiently and more directly applied to the softened portion of the optical fiber in the neckdown area of a furnace.

Further, by the present invention coating concentricity is improved; still further, coating concentricity is made high and stable even in the presence of a lack of symmetry in the die or in the die holder, or in the presence of a lack of alignment of the drawing apparatus.

It will be apparent to those skilled in the art that various modifications and variations can be made in the apparatus and method for fabricating an optical fiber of the present invention without departing from the spirit or scope of the invention. Thus, it is intended that the present invention cover the modifications and variations of this invention provided they come within the scope of the appended claims and their equivalents.

What is claimed is:

1. Optical fiber coating apparatus for providing a coated optical fiber with an axis and a spin with respect to the axis sufficient to provide Polarization Mode Dispersion (PMD) which is not greater than 0.1 ps/Km$^{1/2}$, said apparatus comprising:

a furnace for softening an optical fiber blank;

a tractor for drawing an optical fiber from the softened optical blank and advancing the optical fiber along a path extending from the optical fiber blank, the optical fiber being softened adjacent to the softened optical fiber blank; and spin applying apparatus for applying spin to the softened optical fiber adjacent to the softened optical fiber blank, said spin applying apparatus comprising:

at least one rotatable coating applicator extending around the path of the optical fiber and spaced from the softened optical fiber adjacent the softened optical fiber blank in the direction of the tractor for applying a coating material to the optical fiber;

a coating material in the applicator, the coating material having a viscosity of at least 1 Pas at the temperature at which the coating material is supplied to the applicator;

rotating means coupled to the rotatable coating applicator for rotating the applicator and thereby transmitting torque to the optical fiber through the coating material applied to the optical fiber and applying spin to the softened optical fiber adjacent the softened optical fiber blank, the rotating means being adapted to rotate the rotatable coating applicator at a rotation speed which provides said spin; and a cooling stage disposed intermediate the softened optical fiber and the rotatable coating applicator for cooling fiber in the optical fiber path between the softened optical fiber and the rotatable coating applicator and thereby freezing the spin in the optical fiber which has been produced in the softened optical fiber by rotation of the rotatable coating applicator.

2. The apparatus according to claim 1 characterized in that the rotating means is adapted to rotate the coating applicator at a rotation speed of at least 5000 revolutions per minute.

3. The apparatus according to claim 2 characterized in that the tractor is adapted to draw said fiber at a drawing speed of from 1–10 meters per second and the rotating means is adapted to rotate the coating applicator at a rotation speed of from 10,000 to 30,000 revolutions per minute.

4. The apparatus according to claim 1 wherein the viscosity of the coating material is from 2.1 to 20 Pas.

5. The apparatus according to claim 1 wherein the viscosity of the coating material is from 2.1 to 10 Pas.

6. The apparatus according to claim 1, characterized in that said rotating means comprises an electro-magnetic, mechanical or hydraulic motor, or a gas turbine.

7. The apparatus according to claim 6, characterized in that said rotating means is adapted to rotate said coating applicator in a constant direction.

8. The apparatus according to claim 6, characterized in that said rotating means is adapted to rotate said coating applicator in alternating opposite directions.

9. The apparatus according to claim 1, characterized in that said coating applicator has a concave portion having a passage for the optical fiber.

10. The apparatus according to claim 9 comprising means for feeding said coating material to said concave portion of said coating applicator.

11. The apparatus according to claim 1, characterized in that said coating applicator is of a pressurized type.

12. The apparatus according to claim 11, characterized in that said coating applicator comprises a support and a pressurized concave member surrounding the optical fiber and rotatably engaged to said support.

13. The apparatus according to claim 12, characterized in that rotatable sealing means are provided between said support and said pressurized concave member.

14. The apparatus according to claim 1, further comprising a second coating applicator for applying a coating of a second coating material to the optical fiber.

15. The apparatus according to claim 14, characterized in that the second coating applicator is disposed along the path of the optical fiber intermediate said one rotatable coating applicator and the tractor, wherein the second coating applicator extends around and is rotatable around the optical fiber path, and further comprising a source of the second coating material coupled to the second coating applicator for supplying the second coating material to the second coating applicator as the optical fiber is advanced along said path.

16. The apparatus according to claim 15, characterized in that said second coating applicator is of a pressurized type.

* * * * *